United States Patent
Worley

(10) Patent No.: US 12,107,761 B2
(45) Date of Patent: Oct. 1, 2024

(54) ROUTING HIGH VOLUME PACKET STREAMS IN A VIRTUAL NETWORK

(71) Applicant: Oracle International Corporation, Redwood Shores, CA (US)

(72) Inventor: Dale Raymond Worley, Waltham, MA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/170,991

(22) Filed: Feb. 17, 2023

(65) Prior Publication Data
US 2024/0283734 A1 Aug. 22, 2024

(51) Int. Cl.
*G06F 15/16* (2006.01)
*H04L 43/16* (2022.01)
*H04L 45/12* (2022.01)
*H04L 45/42* (2022.01)

(52) U.S. Cl.
CPC .............. *H04L 45/42* (2013.01); *H04L 43/16* (2013.01); *H04L 45/127* (2013.01)

(58) Field of Classification Search
None
See application file for complete search history.

(56) References Cited

U.S. PATENT DOCUMENTS

| | | | |
|---|---|---|---|
| 8,631,483 B2 * | 1/2014 | Soni | H04L 63/0263 726/13 |
| 11,621,896 B2 * | 4/2023 | Clemm | H04L 69/22 709/224 |
| 2003/0101357 A1 * | 5/2003 | Ronen | H04L 63/1416 709/224 |
| 2006/0010389 A1 * | 1/2006 | Rooney | H04L 63/1458 715/736 |
| 2012/0297083 A1 * | 11/2012 | Ferguson | H04L 69/22 709/233 |
| 2020/0052979 A1 * | 2/2020 | Clemm | H04L 41/5019 |
| 2020/0162431 A1 * | 5/2020 | Goldschlag | H04L 63/20 |
| 2021/0112091 A1 * | 4/2021 | Compton | H04L 63/1416 |

* cited by examiner

*Primary Examiner* — Phuoc H Nguyen
(74) *Attorney, Agent, or Firm* — Kilpatrick Townsend & Stockton LLP

(57) ABSTRACT

A computing device may receive a first packet addressed to a destination node. The device may check a packet counter to determine if the counter exceeds a threshold, the counter recording a number of packets addressed to the destination node that have been received during a first time period. The device may in response to the packet counter exceeding the threshold: send, by the computing device, a query to an intermediate node; generate, by the device, a query flag in response to sending the query. The query flag can indicate that a query has been sent to the intermediate node. A reply from the intermediate node can be received by the device. The reply can identify a set of processes that the intermediate node is configured to perform on the first packet. The set of processes can be applied by the device to the first packet.

20 Claims, 14 Drawing Sheets

ROUTING HIGH VOLUME PACKET STREAMS IN A VIRTUAL NETWORK

BACKGROUND

Packet streams are commonly routed through a virtual network. For example, video feeds for teleconferencing services can be routed through a virtual network. However, current techniques for doing this include sending a query to a forwarding computer to obtain an address for each packet. Such techniques can result in redundant queries when multiple packets are routed to the same address. Thus, challenges exist in packet routing through virtual networks.

BRIEF SUMMARY

Techniques are provided for reducing the number of queries to a forwarding computer when routing high volume packet streams in a virtual network.

In an embodiment, a first packet addressed to a destination node can be received by a computer device. A packet counter can be checked by a computer device to determine if the packet counter exceeds a threshold. The packet counter can record the number of packets addressed to the destination node that have been received during a first time period. In response to the packet counter exceeding a threshold: sending a query to an intermediate node. The query can be sent by the computer device. A query flag can be generated by the computer device in response to sending the query. The query flag can indicate that a query has been sent to the intermediate node. A reply from the intermediate node can be received by the computing device. The reply can identify a set of processes that the intermediate node is configured to perform on the first packet. The set of processes can be applied to the first packet by the computing device.

In one general aspect, the method further comprises receiving a second packet from the destination node. The second packet being received by the computing device. The computing device can determine if the query flag was generated in a second time period before the second packet was received. The set of processes can be applied to the second packet in response to a determination that the query flag was generated during the second time period. The set of processes can be applied by the computing device. The second packet can be forwarded to the destination node in response to a determination that the query flag was generated during the second time period.

In one general aspect, the method can further comprise applying the set of processes to the second packet in response to a determination that the query flag was generated during a third time period. the processes can be applied by the computing device. The second packet can be forwarded to a destination node in response to a determination that the query flag was generated during a third time period. The second packet can be forwarded by a computing device. A second query can be sent to an intermediate node in response to a determination that the query flag was generated during a third time period. the second query can be sent by the computing device. A second query flag can be generated in response to sending the second query. The second query flag can be generated by the computing device. The second query flag can indicate that a query has been sent to the intermediate node. A second reply can be received from the intermediate node. The second reply can be received by the computing device. The second reply can identify a second set of processes that the intermediate node is configured to perform on subsequent packets.

In one general aspect, the method can further comprise discarding the set of processes in response to a determination that the query flag was not generated during the first time period, the second time period, or the third time period.

In one general aspect, the first packet and the second packet can comprise a video stream.

In one general aspect, the instructions for executing the set of processes can be stored in cached memory.

In one general aspect, the set of processes comprises at least one of: discarding the packet, providing an error response to an origin node, or forwarding the packet to the destination node.

One general aspect includes one or more non-transitory computer-readable storage media that may include computer-executable instructions that, when executed by one or more processors of a computing device, cause the computing device to perform instructions comprising: receiving a first packet addressed to a destination node. The first packet can be received by a computing device. A packet counter can be checked by a computer device to determine if the packet counter exceeds a threshold. The packet counter can record the number of packets addressed to the destination node that have been received during a first time period. In response to the packet counter exceeding a threshold: sending a query to an intermediate node. The query can be sent by the computer device. A query flag can be generated by the computer device in response to sending the query. The query flag can indicate that a query has been sent to the intermediate node. A reply from the intermediate node can be received by the computing device. The reply can identify a set of processes that the intermediate node is configured to perform on the first packet. The set of processes can be applied to the first packet by the computing device.

One general aspect includes, a routing system comprising: a memory storing computer-executable instructions and one or more processors configured to access the memory, and execute the computer-executable instructions to at least: receive a first packet addressed to a destination node. The first packet can be received by a computing device. A packet counter can be checked by a computer device to determine if the packet counter exceeds a threshold. The packet counter can record the number of packets addressed to the destination node that have been received during a first time period. In response to the packet counter exceeding a threshold: sending a query to an intermediate node. The query can be sent by the computer device. A query flag can be generated by the computer device in response to sending the query. The query flag can indicate that a query has been sent to the intermediate node. A reply from the intermediate node can be received by the computing device. The reply can identify a set of processes that the intermediate node is configured to perform on the first packet. The set of processes can be applied to the first packet by the computing device.

DETAILED DESCRIPTION

Figure 1:
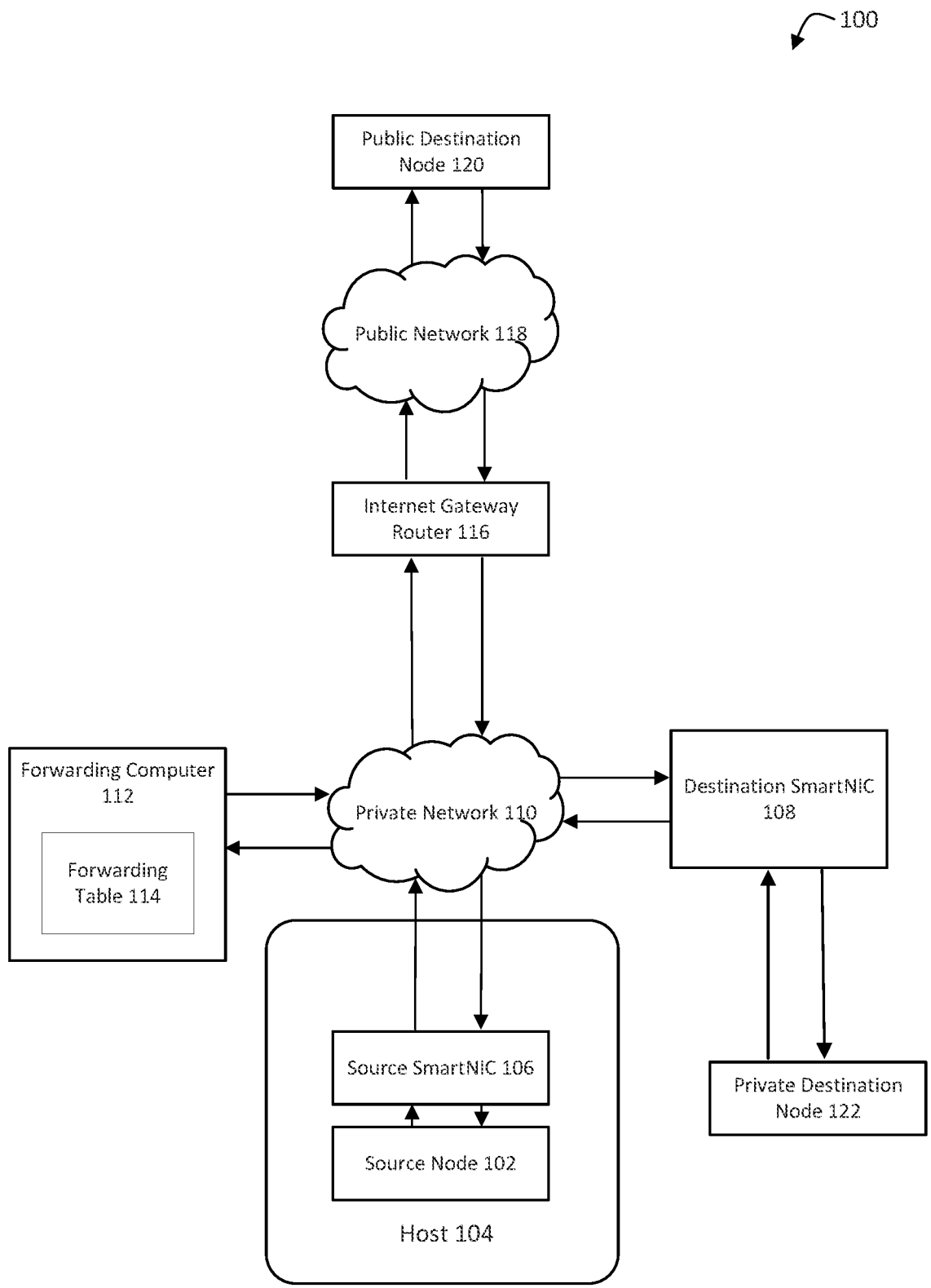
FIG. 1 is a block diagram of a packet routing architecture for a virtual network according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for forwarding traffic to a high volume destination node in a cloud environment. The cloud environment can include a virtual cloud network (VCN) where a user can assign private addresses to elements or subnetworks (subnets) in the VCN. The private addresses can be internet protocol (e.g., IPv4) addresses and the private addresses can be repeated across VCNs. However, as the private addresses are non-unique, the private addresses cannot be used to forward packets through the cloud environment.

Overlay packets within the cloud environment can be forwarded using a unique substrate address. The destination address can be a private address, within a VCN, or a public address on a public network (e.g., the Internet). Upon receiving the overlay packet, a source smart network interface card (smartNIC) can wrap the overlay packet in a forwarding substrate packet with a forwarding substrate address. The forwarding substrate packet can identify the destination network for the overlay packet and the overlay packet can be sent to a forwarding computer identified by the unique forwarding substrate address. The destination network can be a VCN within the cloud environment or the public network outside of the cloud environment.

The forwarding computer can unwrap the forwarding substrate packet to extract the destination address and the destination network for the overlay packet. A destination substrate address for the overlay packet can be determined by the forwarding computer. The destination substrate address can be determined by locating the destination substrate address in a forwarding table using the destination address and destination network. The forwarding computer can wrap the overlay packet in a destination substrate packet. The destination substrate packet can be addressed to the destination substrate address and sent from the forwarding computer.

If the destination is within the virtual cloud environment, the destination substrate packet can be received at a destination smartNIC. The destination smartNIC can disassemble the destination substrate packet and provide the overlay packet to the destination node indicated by the destination address. If the destination is on a public network, the destination substrate packet can be received at an internet gateway router. The destination substrate packet can be unwrapped and the overlay packet can be sent to the destination address on the public network.

If the destination is a high volume destination node, the overlay packet can be sent directly from the source smartNIC to the destination smartNIC or the internet gateway router. The source smartNIC can monitor the number of packets being sent to destination addresses. If the traffic to a destination address exceeds a threshold, the destination address can be a high volume destination node. For instance, a destination address that receives more than 20 packets per second can be a high volume destination address.

In response to identifying a high volume destination node, the source smartNIC can send a query packet to a forwarding computer. The query packet can contain the destination address and the destination network for the high volume destination node. The forwarding computer can identify the destination substrate address in the forwarding table using the destination address and destination network.

A query response packet can be sent from the forwarding computer to the source smartNIC. The query response packet can contain the destination substrate address. The query response packet can also include handling instructions for the overlay packet. The handling instructions can instruct the source smartNIC to discard the overlay packet, to send an error response to the sender (e.g., Internet Control Message Protocol (ICMP) message), or to forward the overlay packet to a forwarding computer as if the destination node were not a high volume destination node.

In response to receiving a query response packet, the source smartNIC can store the information contained in the query response packet in cached memory. The source smartNIC can wrap the overlay packet in a destination substrate packet and forward the destination substrate packet to a destination smartNIC or internet gateway router as described above. If the source smartNIC is directed to send subsequent packets to the high volume destination node within a first time period (e.g., 2 seconds), the source smartNIC can wrap the subsequent packets in destination substrate packets and forward the packets to the destination smartNIC or internet gateway router using the cached instructions.

If a subsequent packet is received during a second time period, after the first time period, the subsequent packet can be wrapped in a destination substrate packet and forward the packet to the destination smartNIC or internet gateway router using the cached instructions. The smartNIC can send a query packet to the forwarding computer to obtain an updated destination substrate address and updated handling instructions. The updated information from the forwarding computer can be stored in the source smartNIC's cached memory. If a subsequent packed is received after the second time period, the source smartNIC can disregard the information stored in cached memory and the source smartNIC can send a forwarding substrate packet as described above.

The time period can be determined by reference to a query flag generated by the smartNIC when a query packet is sent from the smartNIC to a forwarding computer.

In an illustrative example, a source smartNIC receives video streaming packets from a virtual machine (VM) instance in a VCN. The video streaming packets are addressed to a destination VM instance in the VCN. For the first second of the video stream, the video streaming packets are forwarded from the source smartNIC to a destination smartNIC via a forwarding computer as described above. After the first second of the video stream, the source smartNIC detects that 23 packets per second are being sent to the destination VM's destination address. The 23 packets per second exceed the 20 packet per second threshold and the destination VM's destination address can be designated as a high volume destination node.

In response to a designation that the destination node is a high volume destination node, the source smartNIC sends a query packet, containing a destination address for the destination node and destination network, to a forwarding computer. The forwarding computer uses the query packet's contents to identify the destination substrate address in the forwarding computer's forwarding table. A query response with handling instructions and a destination substrate address is sent from the forwarding computer to the source smartNIC.

In response to receiving the query response, the source smartNIC stores the destination substrate address and handling instructions in the smartNIC's cache memory. For the duration of the video stream, the smartNIC wraps packets addressed to the destination VM in destination substrate packets. The destination substrate packets are forwarded to the destination smartNIC and delivered to the destination VM. While the video stream lasts, a query packet is sent to a forwarding computer every 2 seconds to obtain an updated destination substrate address and updated handling instructions. By using query packets, the number of packets sent from the source smartNIC to a forwarding computer is reduced from 23 packets per second to 0.5 packets per second.

FIG. 1 is a block diagram 100 of a packet routing architecture for sending overlay packets to destination nodes according to an embodiment.

Overlay packets can originate at a source node 102 in a host 104. Source node 102 can be a virtual cloud network (VCN) or a subnetwork (subnet) within a VCN. Host 104 can be a virtual machine (VM) or a bare-metal server. Source smart network interface card (smartNIC) 106 and destination smartNIC 108 can be a physical NIC or a virtual NIC (VNIC). Source smartNIC 106 and destination smartNIC 108 can send and receive packets from private network 110.

Forwarding computer 112 can send and receive overlay packets from private network 110. Forwarding computer can be a server computer that contains a forwarding table 114. Forwarding table 114 can contain a list of unique substrate address corresponding to a combination of destination addresses and destination networks. Destination addresses can be private addresses or public addresses. Private addresses can be assigned within a VCN and the private addresses used in one VCN can be repeated in a different VCN. Public addresses can be unique addresses on a public network. A public address can be used within a VCN as a private address. Forwarding table 114 can include handling instructions for the unique substrate addresses. The handling instructions can include instructions to discard an overlay packet, to send an error response to the sender (e.g., Internet Control Message Protocol (ICMP) message), or to forward an overlay packet to a forwarding computer as if the destination node were not a high volume destination node.

Internet gateway router 116 can permit overlay packets to be sent or received from a public network 118. For example, public network 118 can be the Internet. An overlay packet can be forwarded from private network 110 to internet gateway router 116 using a wrapper with a unique substrate address. An overlay packet received at internet gateway router 116 can be sent to a public destination node 120 via public network 118. The overlay packet can be sent from internet gateway router 116 to public destination node 120 using a public address. An overlay packet can be forwarded from private network 110 to destination smartNIC 108 using a unique destination substrate address. The overlay packet can be forwarded from destination smartNIC 108 to a private destination node 122 using a private address associated with the packet.

Figure 2:
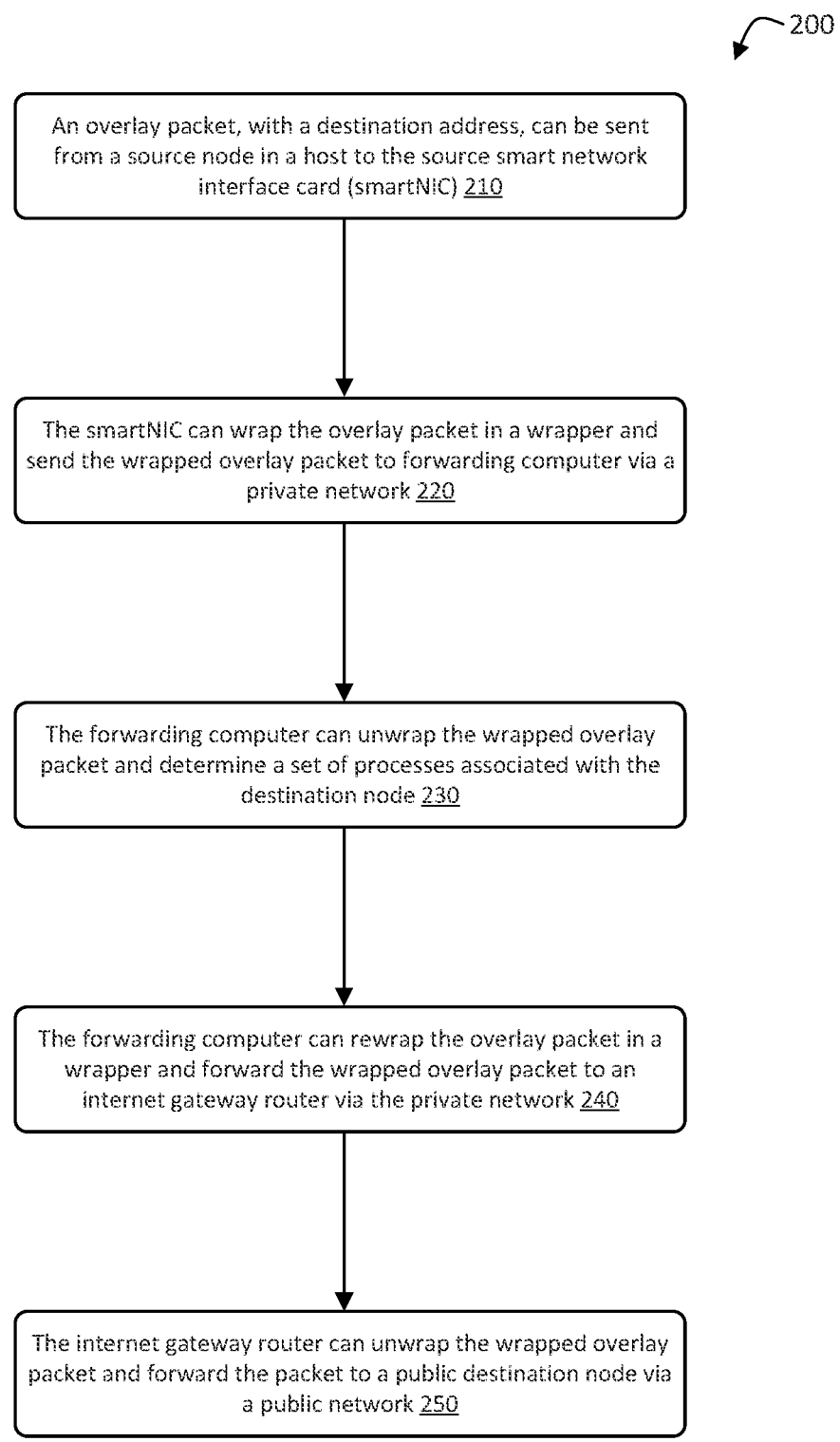
FIG. 2 shows a process for sending an overlay packet to a destination node on a public network according to an embodiment.

FIG. 2 shows a process 200 for sending a packet to a public destination node on a public network according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 200 in greater detail, at block 210 an overlay packet can be sent from a source node 102 in a host 104 to the source smart network interface card 106 (smartNIC). The overlay packet can be addressed to a destination node with a destination address and the destination address can be a public address in a public network. The destination address can be an internet protocol version 4 (IPv4) address and the public network can be the Internet.

At block 220, the source smartNIC 106 can wrap the overlay packet in a wrapper. The wrapped overlay packet can be sent to the forwarding computer 112 via private network 110. The wrapper can be addressed with a unique substrate address. The unique substrate address can be a forwarding substrate address that can be an address to a forwarding computer such as forwarding computer 112. While the public address can be unique within the public network, a private address within the cloud environment can be identical to the public address. The public address can be repeated within the cloud environment, so the overlay packet can use the wrapper and a unique substrate address to send the overlay packet to forwarding computer 112.

At block 230, forwarding computer 112 can unwrap the wrapped overlay packet and determine a set of packet processes. The set of packet processes can include a destination substrate address and a set of handling instructions. Forwarding computer 112 can determine the destination substrate address using forwarding table 114. Forwarding table 114 can contain a list of unique substrate addresses indexed by the destination address and the destination network. Substrate addresses can be forwarding substrate addresses if the address identifies a forwarding computer. Substrate addresses can be destination substrate addresses if the address identifies a destination smartNIC or an internet gateway router. Forwarding computer 112 can use the destination address and the destination network to locate a unique forwarding substrate address in forwarding table 114.

At block 240, forwarding computer 112 can rewrap the overlay packet in a wrapper addressed to the destination substrate address. The destination substrate address can be a unique address that identifies internet gateway router 116. The wrapped overlay packet can be forwarded to the internet gateway router 116 via private network 110.

At block 250, internet gateway router 116 can unwrap the wrapped overlay packet and forward the overlay packet to a public destination node 120 via a public network. The overlay packet can be sent to public destination node 120 using the destination address associated with the overlay packet. The destination address can be a public address.

Figure 3:
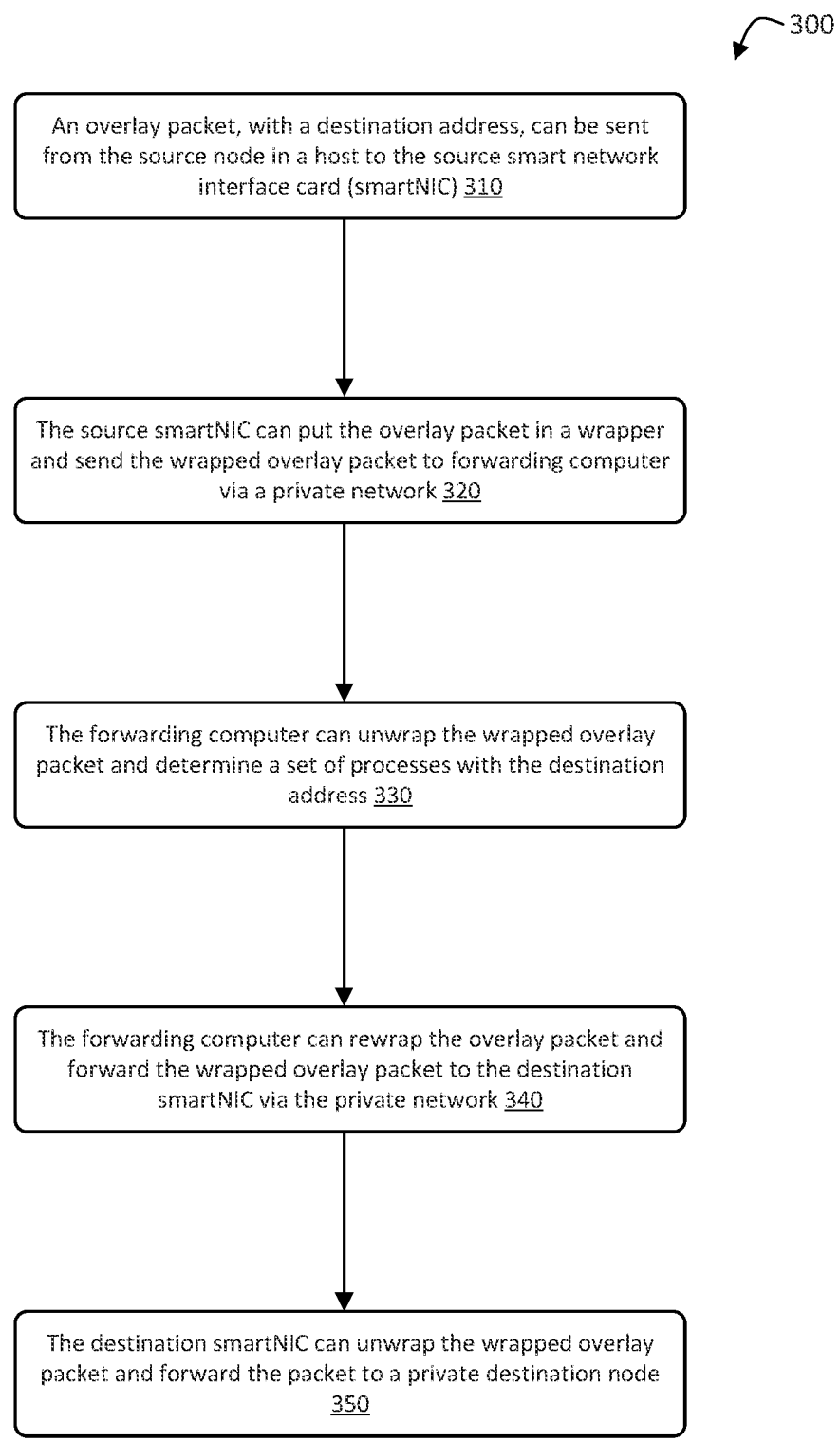
FIG. 3 shows a process for sending an overlay packet to a private destination node according to an embodiment.

FIG. 3 shows a process 300 for sending an overlay packet to a private destination node according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 300 in greater detail, at block 310 an overlay packet can be sent from a source node 102 in a host 104 to the source smart network interface card 106 (smartNIC). The overlay packet can be addressed to a destination node with a destination address and the destination address can be a public address in a public network. The destination address can be an internet protocol version 4 (IPv4) address and the public network can be the Internet.

At block 320, the source smartNIC 106 can wrap the overlay packet in a wrapper. The wrapped overlay packet can be sent to the forwarding computer 112 via private network 110. The wrapper can be addressed with a unique substrate address. The unique substrate address can be a forwarding substrate address that can be an address to a forwarding computer such as forwarding computer 112. While the public address can be unique within the public network, a private address within the cloud environment can be identical to the public address. The public address can be repeated within the cloud environment, so the overlay packet can use the wrapper and a unique substrate address to send the overlay packet to forwarding computer 112.

At block 330, forwarding computer 112 can unwrap the wrapped overlay packet and determine a set of packet processes associated with the overlay packet. The set of packet processes can include a destination substrate address and a set of handling instructions. Forwarding computer 112 can determine the destination substrate address using forwarding table 114. Forwarding table 114 can contain a list of unique substrate addresses indexed by the destination address and the destination network. Substrate addresses can be forwarding substrate addresses if the address identifies a forwarding computer. Substrate addresses can be destination substrate addresses if the address identifies a destination smartNIC or an internet gateway router. Forwarding computer 112 can use the destination address and the destination network to locate a unique forwarding substrate address in forwarding table 114.

At block 340, forwarding computer 112 can rewrap the overlay packet in a wrapper addressed to the destination substrate address. The destination substrate address can be a unique address that identifies destination smartNIC 108.

At block 350, destination smartNIC 108 can unwrap the wrapped overlay packet and forward the overlay packet to a private destination node 122. The overlay packet can be sent from destination smartNIC 108 to private destination node 122 using the destination address. In some implementations, the smartNIC can send the unwrapped overlay packet to private destination node 122 using a substrate address.

Figure 4:
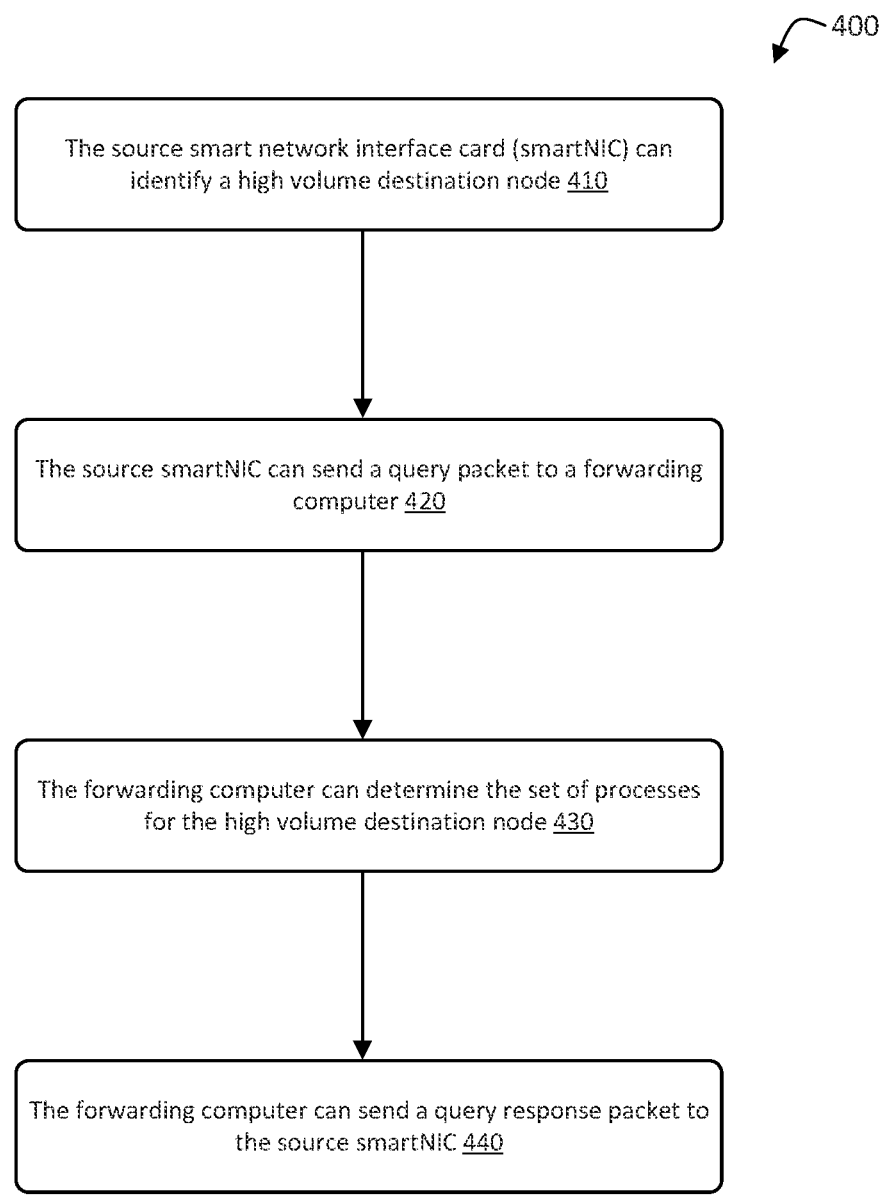
FIG. 4 shows a process for retrieving forwarding instructions from a forwarding computer according to an embodiment.

FIG. 4 shows a process 400 for retrieving forwarding instructions from a forwarding computer according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 400 in greater detail, at block 410, the source smart network interface card (smartNIC) 106 can identify a high volume destination node. A destination node (e.g., public destination node 120 or private destination node 122) can be identified as a high volume destination node if the number of packets sent from the source smartNIC 106 to a destination node exceeds a threshold. The threshold can be 20 packets per second.

At block 420, the source smartNIC 106 can send a query packet to a forwarding computer 112. The query packet can contain the destination address and the destination network. The destination address can be a public destination address on a public network (e.g., the Internet). The destination address can be a private address on a private network. The destination network can be a public network (e.g., the Internet) or a private network (e.g., a cloud network). The query packet can be sent in response to a determination that a destination node is a high volume destination node.

At block 430, the forwarding computer 112 can determine the destination substrate address and handling instructions for the high volume destination node. Forwarding computer 112 can determine a set of packet processes. The packet processes can include a destination substrate address and handling instructions using the contents of the query packet. The contents of the query packet can include a destination address and a destination network. Forwarding computer 112 can look up the destination substrate address or handling instructions in forwarding table 114. The handling instructions can instruct the source smartNIC to discard the overlay packet, to send an error response to the sender (e.g., Internet Control Message Protocol (ICMP) message), or to forward the overlay packet to a forwarding computer as if the destination node were not a high volume destination node.

At block 440, the forwarding computer 112 can send a query response packet to the source smartNIC 106. The query response can contain a destination substrate address. The query response can contain one or more handling instructions. The smartNIC 106 can store the contents of the query response packet in cached memory. The smartNIC 106 can apply stored handling instructions associated with a high volume destination node to an overlay packet addressed to the high volume destination node. The smartNIC 106 can forward an overlay packet addressed to a high volume destination node using a stored destination substrate address associated with the high volume destination node.

Stored handling instructions or a stored destination substrate address associated with a high volume destination node can be out of date if the address or instructions have been stored in cached memory for longer than a first time period. If a overlay packet addressed to the high volume destination node is received and the address or instructions are out of date, a query packet can be sent to forwarding computer 112 to receive updated handling instructions and an updated destination substrate address. The first time period can be 2 seconds. If the handling instructions or destination substrate address have been stored in cached memory for longer than a second time period, an overlay packet addressed to the high volume destination node can be sent according to the processes disclosed above in reference FIG. 2 or 3. The second time period can be 4 seconds.

Figure 5:
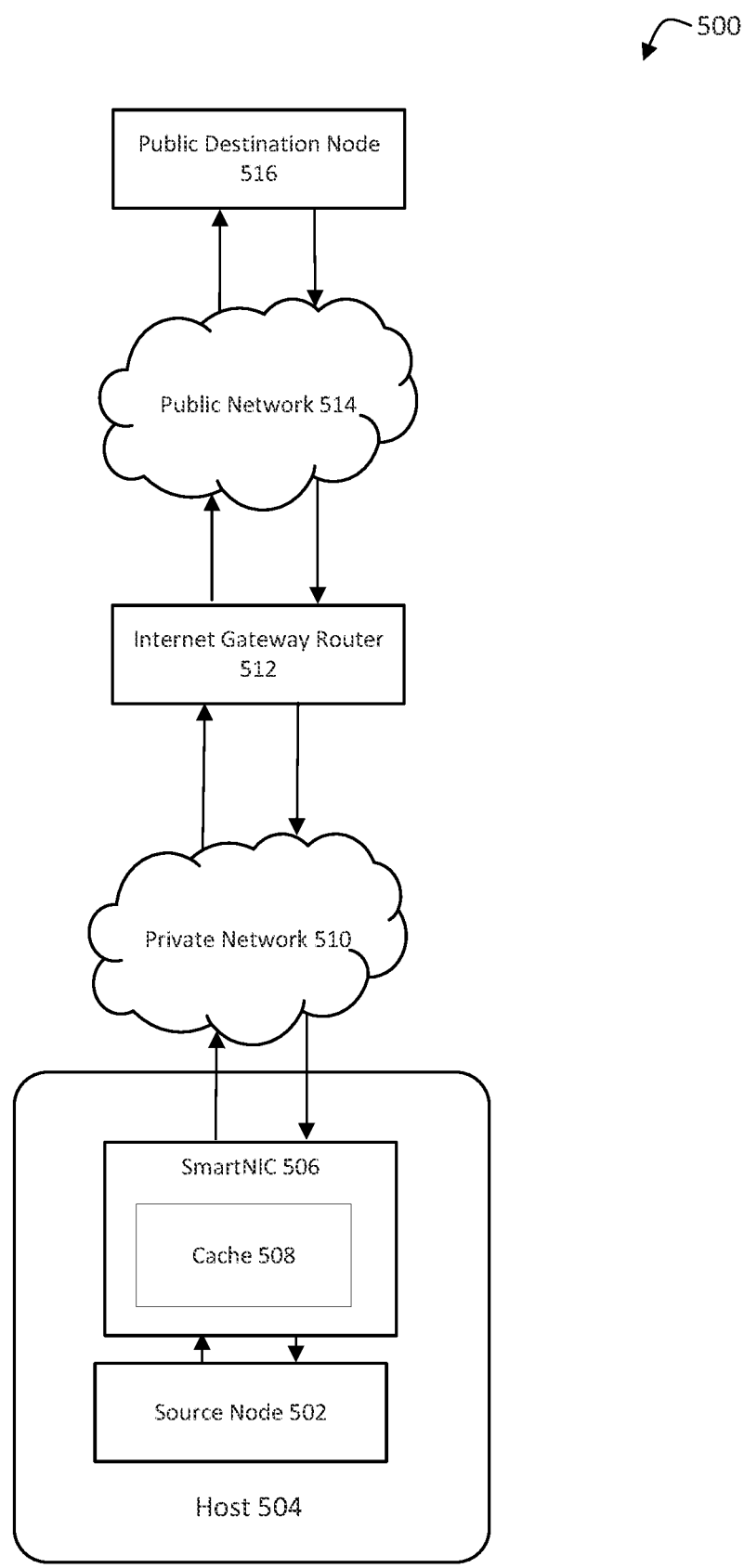
FIG. 5 is a block diagram of a packet routing architecture for sending overlay packets to high volume destination node on a public network according to an embodiment.

FIG. 5 is a block diagram 500 of a packet routing architecture for sending overlay packets to a high volume destination node on a public network according to an embodiment.

Overlay packets can originate at a source node 502 in a host 504. Source node 502 can be a virtual cloud network (VCN) or a subnetwork (subnet) within a VCN. Host 504 can be a virtual machine (VM) or a bare-metal server. Source smart network interface card (smartNIC) 506 can be a physical NIC or a virtual NIC (VNIC). Source smartNIC can contain cache 508. Cache 508 can be memory including cached memory. Source smartNIC 506 can send and receive packets from private network 510.

Cache 508 can contain a list of unique substrate address corresponding to a combination of destination addresses and destination networks. The unique substrate addresses can be obtained according to the process disclosed above in reference to FIG. 4. Destination addresses can be private addresses or public addresses. Private addresses can be assigned within a VCN and the private addresses used in one VCN can be repeated in a different VCN. Public addresses can be unique addresses on a public network. A public address can be used within a VCN as a private address.

Cache 508 can contain handling instructions obtained according to the process disclosed above in reference to FIG. 4. The handling instructions can include instructions to discard an overlay packet, to send an error response to the sender (e.g., Internet Control Message Protocol (ICMP) message), or to forward an overlay packet to a forwarding computer as if the destination node were not a high volume destination node.

Internet gateway router 512 can permit overlay packets to be sent or received from a public network 514. For example, public network 514 can be the Internet. An overlay packet can be forwarded from private network 510 to internet gateway router 512 using a wrapper with a unique substrate address. An overlay packet received at internet gateway router 512 can be sent to a public destination node 516 via public network 514. The overlay packet can be sent from internet gateway router 512 to public destination node 5216 using a public address.

Figure 6:
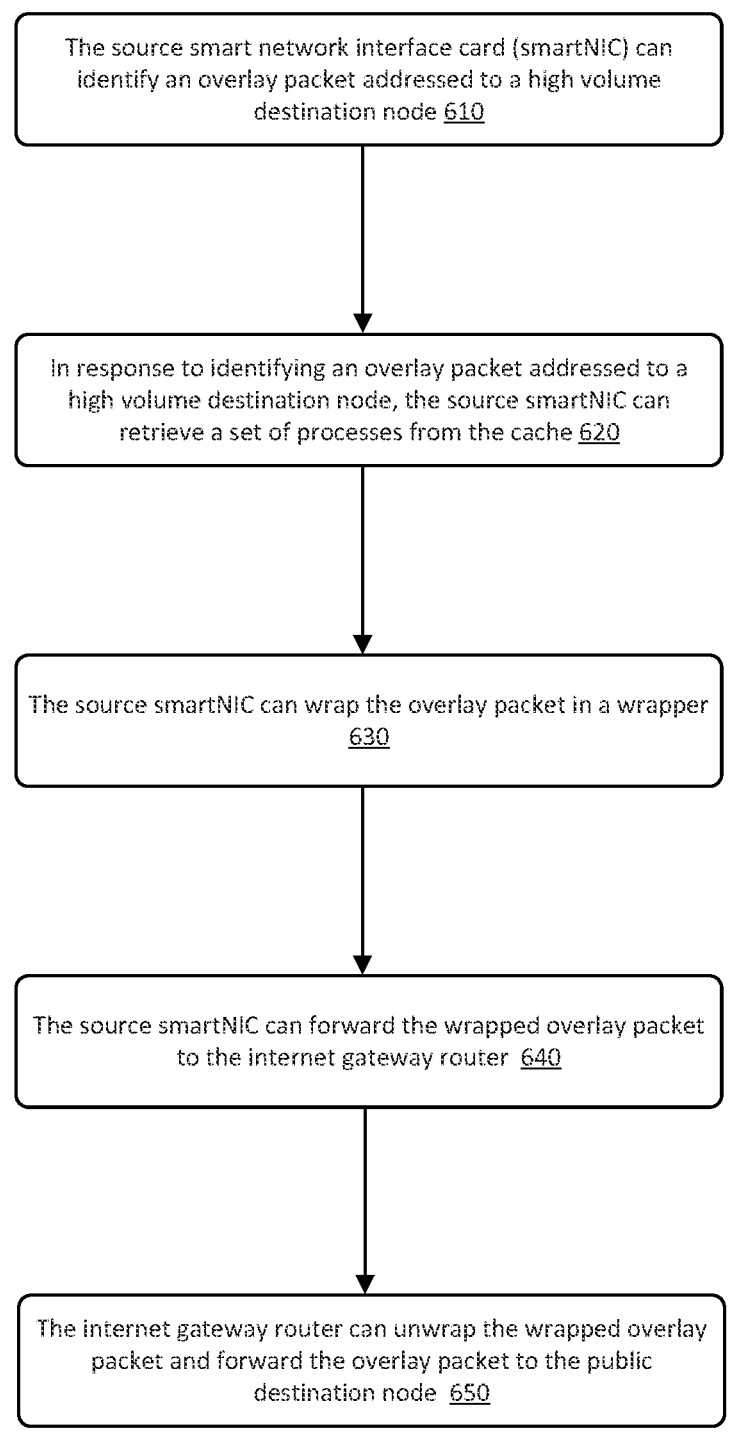
FIG. 6 shows a process for sending overlay packets to a high volume destination node on a public network according to an embodiment.

FIG. 6 shows a process 600 for sending overlay packets to a high volume destination node on a public network according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 600 in greater detail, at block 610, the smart network interface card (smartNIC) 506 can identify an overlay packet addressed to a high volume destination node. Source smartNIC 506 can identify an overlay packet addressed to a high volume destination node using cache 508. SmartNIC can use cache 508 to identify an overlay packet addressed to a high volume destination node by checking if a destination substrate address associated with the overlay packet is stored in cache 508. A destination substrate address can be associated with the overlay packet if the destination substrate address is associated with the overlay packet's destination address and the overlay packet's destination network. The query flag can indicate when a query packet for a particular destination address and destination network was sent to a forwarding computer. The query flag can indicate when a query response packet for a particular destination address and destination network was received from a forwarding computer.

At block 620, in response to identifying an overlay packet addressed to a high volume destination node, source smartNIC 506 can retrieve the packet processes from cache 508. The packet processes can include a destination substrate address and a set of handling instructions. The destination substrate address can be retrieved from cache 508 by identifying a destination substrate address associated with the overlay packet's destination address and the overlay packet's destination network. Handling instructions for the overlay packet can be retrieved from cache 508. The handling instructions can be retrieved from cache 508 by identifying a destination substrate address associated with the overlay packet's destination address and the overlay packet's destination network. If the destination substrate address or handling instructions have been stored in cache 508 for longer than a first time period, a query packet can be sent as described in relation to FIG. 4. If the destination substrate address or handling instructions have been stored in cache 508 for longer than a second time period, the overlay packet can be sent according to the process disclosed in relation to FIG. 2. The time period can be determined using the time indicated by the query flag.

At block 630, source smartNIC 506 can wrap the overlay packet in a wrapper. The wrapper can be addressed to the destination substrate address. Source smartNIC 506 can apply handling instructions to the overlay packet. The handling instructions can instruct source smartNIC 506 to discard the overlay packet, to send an error response to the sender (e.g., Internet Control Message Protocol (ICMP) message), or to forward the overlay packet to a forwarding computer as if the destination node were not a high volume destination node.

At block 640, source smartNIC 506 can forward the wrapped overlay packet to internet gateway router 512. The wrapped overlay packet can be routed by private network 510 to internet gateway router 512. The wrapped overlay packet can be routed using the destination substrate address associated with the high volume destination node. The destination substrate address can be associated with internet gateway router 512.

At block 650, internet gateway router 512 can unwrap the wrapped overlay packet and forward the overlay packet to the high volume destination node. The high volume destination node can be public destination node 516. The overlay packet can be routed to internet gateway router 512 to public destination node 516 using public network 514. The overlay packet can be routed by public network 514 using a destination address associated with public destination node 516.

Figure 7:
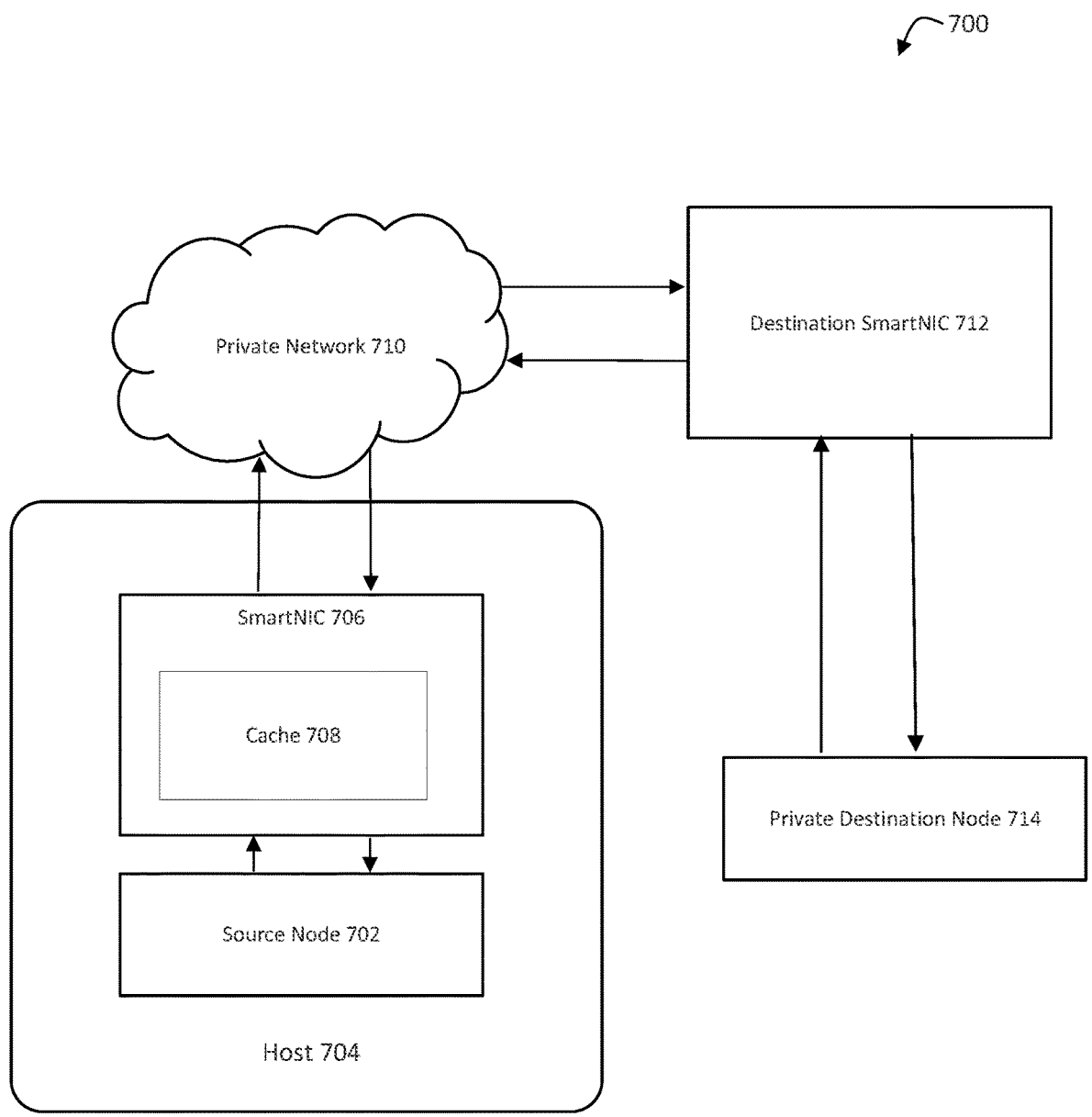
FIG. 7 is a block diagram of a packet routing architecture for sending overlay packets to a high volume destination node according to an embodiment.

FIG. 7 is a block diagram 700 of a packet routing architecture for sending overlay packets to a high volume destination node according to an embodiment.

Overlay packets can originate at a source node 702 in a host 704. Source node 702 can be a virtual cloud network (VCN) or a subnetwork (subnet) within a VCN. Host 704 can be a virtual machine (VM) or a bare-metal server. Source smart network interface card (smartNIC) 706 can be a physical NIC or a virtual NIC (VNIC). Source smartNIC can contain cache 708. Cache 708 can be memory including cached memory. Source smartNIC 706 can send and receive packets from private network 710.

Cache 708 can contain a list of unique substrate addresses corresponding to a combination of destination addresses and destination networks. The unique substrate addresses can be obtained according to the process disclosed above in reference to FIG. 4. Destination addresses can be private addresses or public addresses. Private addresses can be assigned within a VCN and the private addresses used in one VCN can be repeated in a different VCN. Public addresses can be unique addresses on a public network. A public address can be used within a VCN as a private address.

Cache 708 can contain handling instructions obtained according to the process disclosed above in reference to FIG. 4. The handling instructions can include instructions to discard an overlay packet, to send an error response to the sender (e.g., Internet Control Message Protocol (ICMP) message), or to forward an overlay packet to a forwarding computer as if the destination node were not a high volume destination node.

An overlay packet can be forwarded from private network 710 to destination smartNIC 108. The overlay packet can be wrapped and the wrapped overlay packet can be forwarded from private network 710. The overlay packet or wrapped overlay packet can be forwarded using a destination substrate address. Destination smartNIC 712 can unwrap a wrapped overlay packet received at destination smartNIC 712. The overlay packet can be forwarded from destination smartNIC 712 to a private destination node 714 using a private address associated with the overlay packet.

Figure 8:
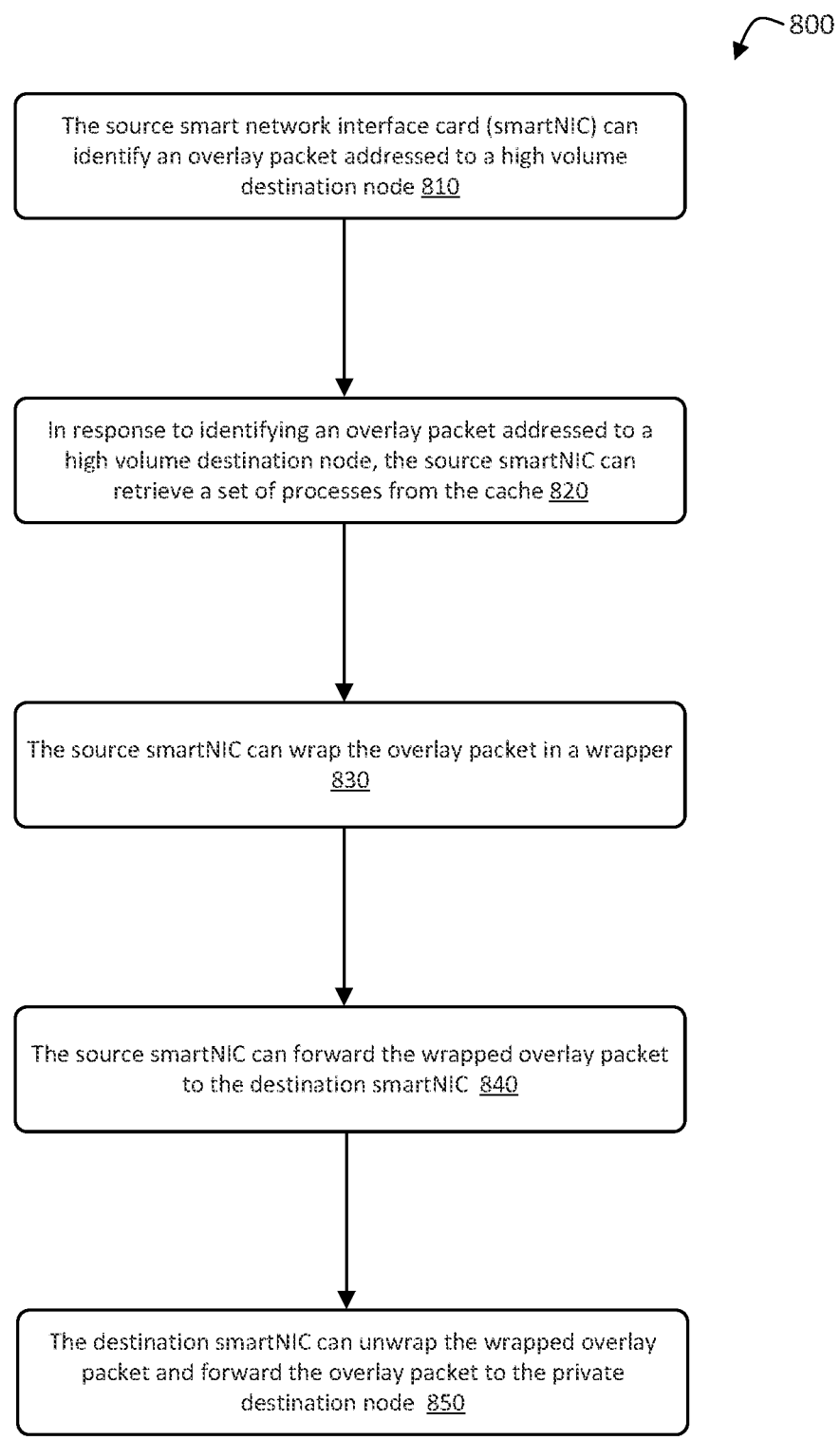
FIG. 8 shows a process for sending overlay packets to a high volume destination node according to an embodiment.

FIG. 8 shows a process 800 for sending overlay packets to a high volume destination node according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 800 in greater detail, at block 810, the smart network interface card (smartNIC) 706 can identify an overlay packet addressed to a high volume destination node. SmartNIC 706 can identify an overlay packet addressed to a high volume destination node using cache 708. In some implementations, smartNIC can use cache 708 to identify an overlay packet addressed to a high volume destination node by checking if a destination substrate address associated with the overlay packet is stored in cache 708. A destination substrate address can be associated with the overlay packet if the destination substrate address is associated with the overlay packet's destination address and the overlay packet's destination network. A query flag can be stored in cache 708. The query flag can indicate when a query packet for a particular destination address and destination network was sent to a forwarding computer. The query flag can indicate when a query response packet for a particular destination address and destination network was received from a forwarding computer.

At block 820, in response to identifying an overlay packet addressed to a high volume destination node, source smartNIC 706 can retrieve a set of processes from cache 508. The packet processes can include a destination substrate address and a set of handling instructions. The destination substrate address can be retrieved from cache 708 by identifying a destination substrate address associated with the overlay packet's destination address and the overlay packet's destination network. Handling instructions for the overlay packet can be retrieved from cache 708. The handling instructions can be retrieved from cache 708 by identifying a destination substrate address associated with the overlay packet's destination address and the overlay packet's destination network. If the destination substrate address or handling instructions have been stored in cache 708 for longer than a first time period, a query packet can be sent as described in relation to FIG. 4. If the destination substrate address or handling instructions have been stored in cache 708 for longer than a second time period, the overlay packet can be sent according to the process disclosed in relation to FIG. 2. The time period can be determined using the time associated with the query flag.

At block 830, source smartNIC 706 can wrap the overlay packet in a wrapper. The wrapper can be addressed to the destination substrate address. SmartNIC 706 can apply handling instructions to the overlay packet. The handling instructions can instruct source smartNIC 706 to discard the overlay packet, to send an error response to the sender (e.g., Internet Control Message Protocol (ICMP) message), or to forward the overlay packet to a forwarding computer as if the destination node were not a high volume destination node.

At block 840, source smartNIC 706 can forward the wrapped overlay packet to destination smartNIC 712. The wrapped overlay packet can be routed by private network 710 to destination smartNIC 712. The wrapped overlay packet can be routed using the destination substrate address associated with the high volume destination node. The destination substrate address can be associated with destination smartNIC 712.

At block 850, destination smartNIC 712 can unwrap the wrapped overlay packet and forward the overlay packet to the high volume destination node. The high volume destination node can be private destination node 714. The overlay packet can be routed from destination smartNIC 712 to private destination node 714 using the destination substrate address. The overlay packet can be routed from destination smartNIC 712 to private destination node 714 using the destination address.

Figure 9:
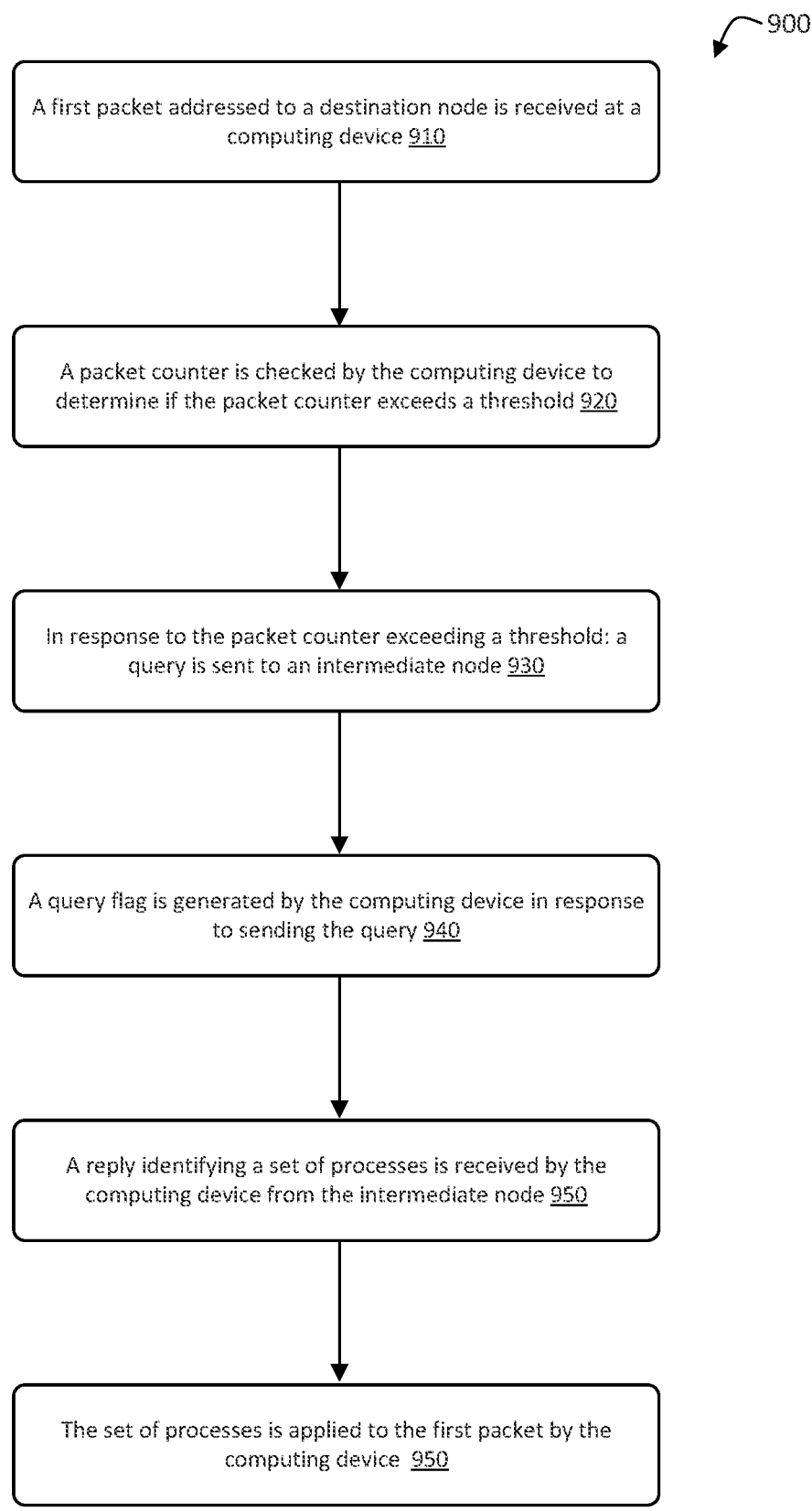
FIG. 9 is a method 900 for retrieving a set of processes from a forwarding computer according to an embodiment.

FIG. 9 is a method 900 for retrieving a set of processes from a forwarding computer according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 900 in greater detail, at block 910, a first packet addressed to a destination node is received at the computing device. The computing device can be a network interface card (NIC). The network interface card can be a virtual network interface card (VNIC) or a smart network interface card (smartNIC) (e.g., source smartNIC 106). The first packet can be an overlay packet. The first packet, second packet, and subsequent packets can comprise a video stream. The destination node can be a public destination node on a public network (e.g., public destination node 120). The destination node can be a private destination node on a private network (e.g., private destination node 122).

At block 920, a packet counter is checked by the computing device to determine if the packet counter exceeds a threshold. The packet counter can determine the number of packets addressed to a particular destination node. The threshold can be 20 packets per second.

At block 930, a query is sent to an intermediate node. The query can be sent in response to a determination that the packet counter exceeds a threshold. The determination can be made by the computing device. The intermediate node can be a forwarding computer (e.g., forwarding computer 112. The query can be sent as a query packet as described above.

At block 940, a query flag is generated by the computing device in response to sending the query. The query flag can indicate when a query packet for a particular destination address and destination network was sent to a forwarding computer. In some implementations, the query flag can indicate when a query response packet for a particular destination address and destination network was received from a forwarding computer. The query flag can be used to determine if a set of processes was received in a first time period or a second time period. The query flag can be stored in cached memory (e.g., cache 708).

At block 950, a reply identifying a set of processes is received by the computing device. The reply can be sent by an intermediate node. The set of processes can include a destination substrate address. In some implementations, the set of processes can include a set of handling instructions. The handling instructions can instruct the source smartNIC to discard the overlay packet, to send an error response to the origin node (e.g., Internet Control Message Protocol (ICMP) message), or to forward the overlay packet to a forwarding computer as if the destination node were not a high volume destination node.

At block 960, the set of processes is applied to the first packet by the computing device. Applying the set of processes to the first packet can include wrapping the first packet in a wrapper. The wrapper can be addressed to a destination substrate address from the set of processes.

Method 900 may include additional implementations, such as any single implementation or any combination of implementations described below and/or in connection with one or more other processes described elsewhere herein.

Although FIG. 9 shows example blocks of method 900, in some implementations, method 900 may include additional blocks, fewer blocks, different blocks, or differently arranged blocks than those depicted in FIG. 9. Additionally, or alternatively, two or more of the blocks of method 900 may be performed in parallel.

In some implementations, method 900 can include receiving a second packet for the destination node. The second packet can be an overlay packet addressed to a destination node. The method 900 can include determining if the query flag that was generated in a second time period before the second packet was received. The second time period can be up to 2 seconds after the query flag or second query flag is generated. The method 900 can include applying the set of methods to the second packet in response to a determination that the query flag was generated during the second time period. The method 900 can include forwarding the second packet to a destination node in response to a determination that the query flag was generated during the second time period.

In some implementations, method 900 can include applying the set of methods to the second packet in response to a determination that the query flag was generated during a third time period. The third time period can be between 2 and 4 seconds after the query flag or second query flag was generated. The first packet, second packet and subsequent packets can comprise a video stream. Method 900 can include forwarding a second packet to the destination node in response to a determination that the query flag was generated during a third time period. method 900 can include sending a second query to an intermediate node in response to a determination that the query flag was generated during a third time period. The second query can be sent by the computing device. method 900 can include generating a second query flag in response to sending the second query. The second query flag can indicate that a query has been sent to the intermediate node.

In some implementations, method 900 can include discarding the set of methods in response to a determination that the query flag was not generated during the first time period, second time period, or the third time period. The first time period can be between 0 and 2 seconds before the first packet was received. The second time period can be between 0 and 2 seconds after the query flag or second query flag is generated. The third time period can be between 2 and 4 seconds after the query flag or second query flag is generated. The second query flag can be generated by the computing device. method 900 can include receiving a second reply from the intermediate node. The second reply can be received by the computing device. The second reply can identify a second set of methods that the intermediate node is configured to perform on subsequent packets. The subsequent packets can be overlay packets. The second set of methods can be a set of methods like the first set of processes.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
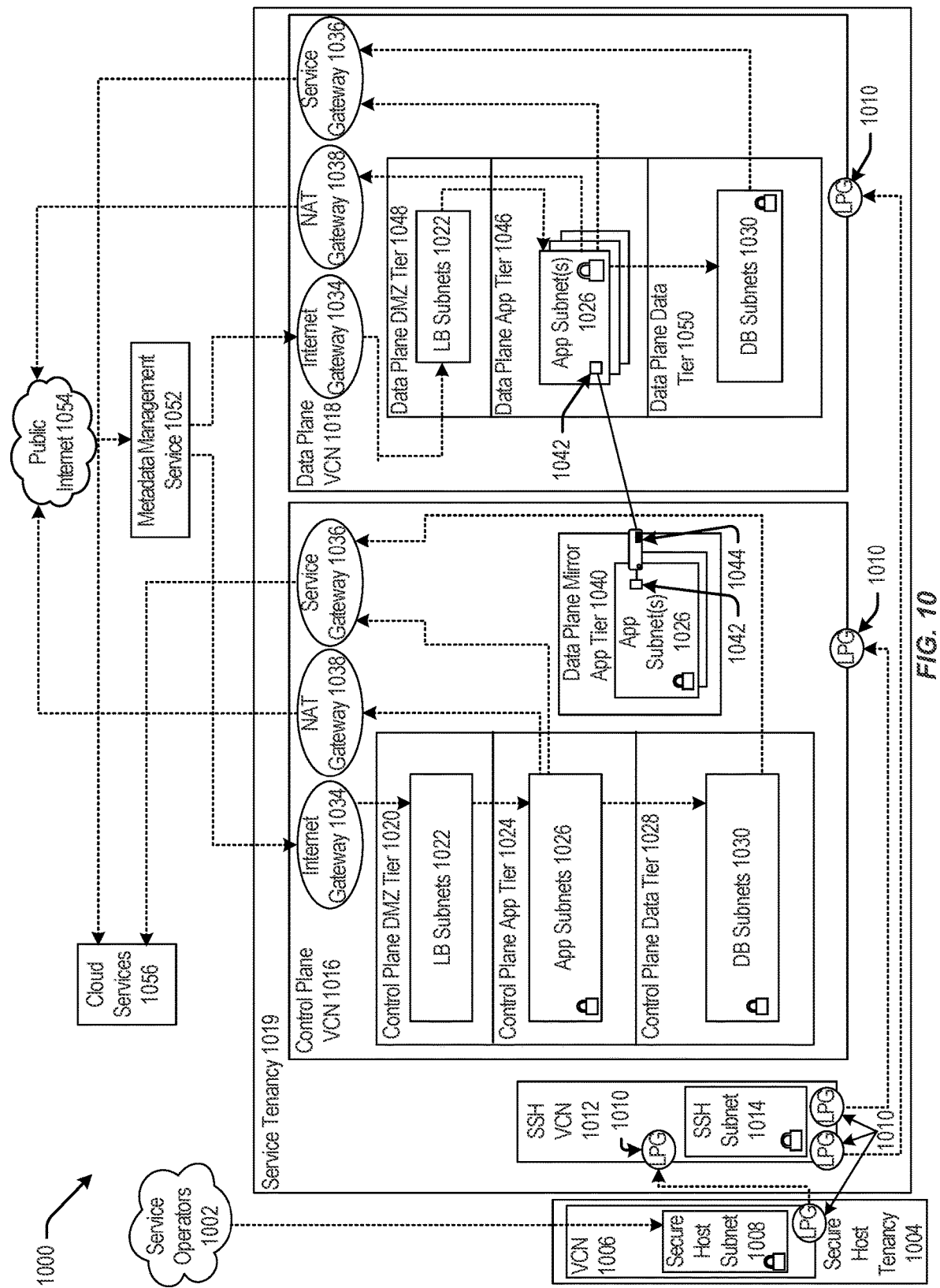
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry®, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
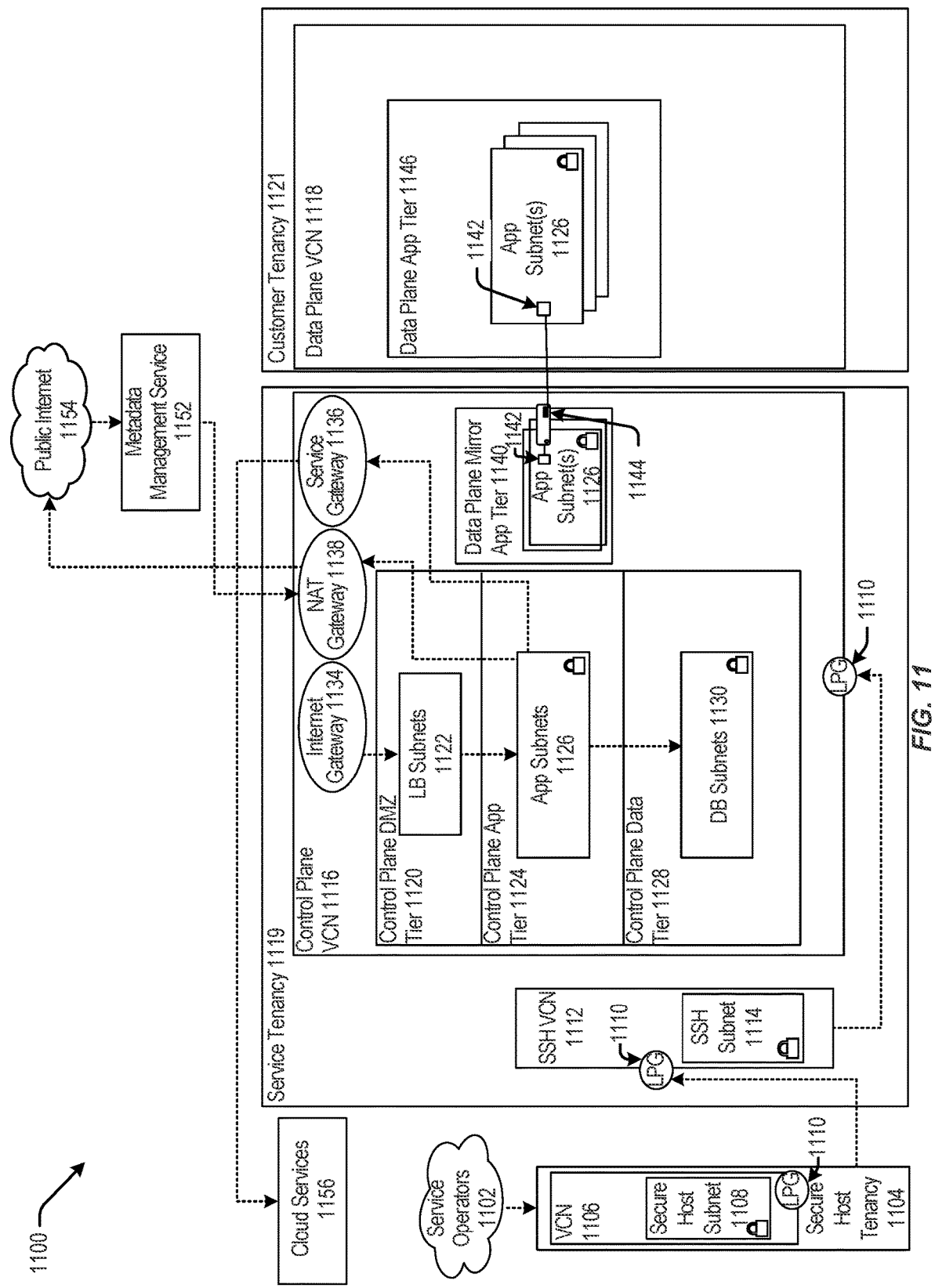
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
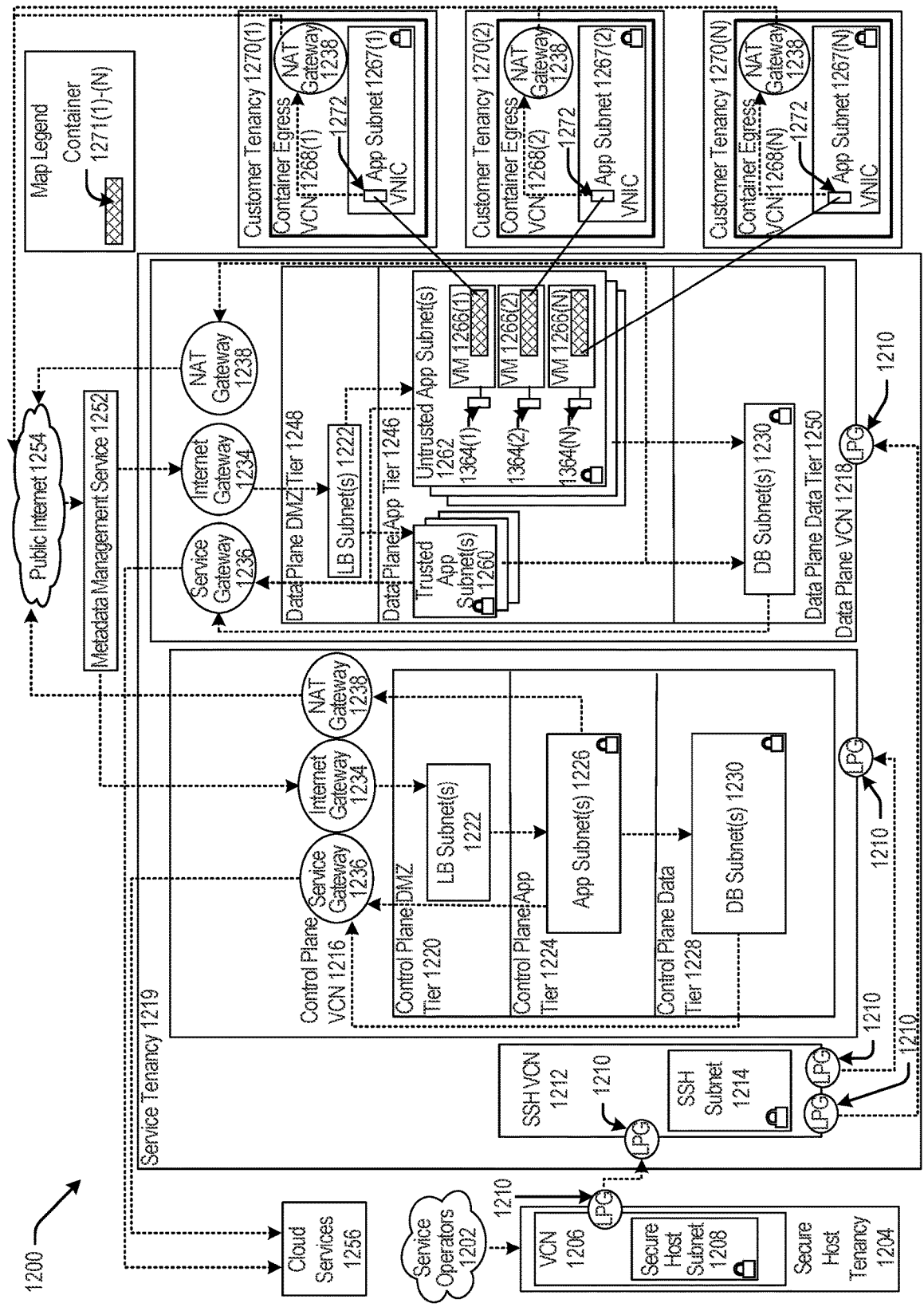
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG 1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
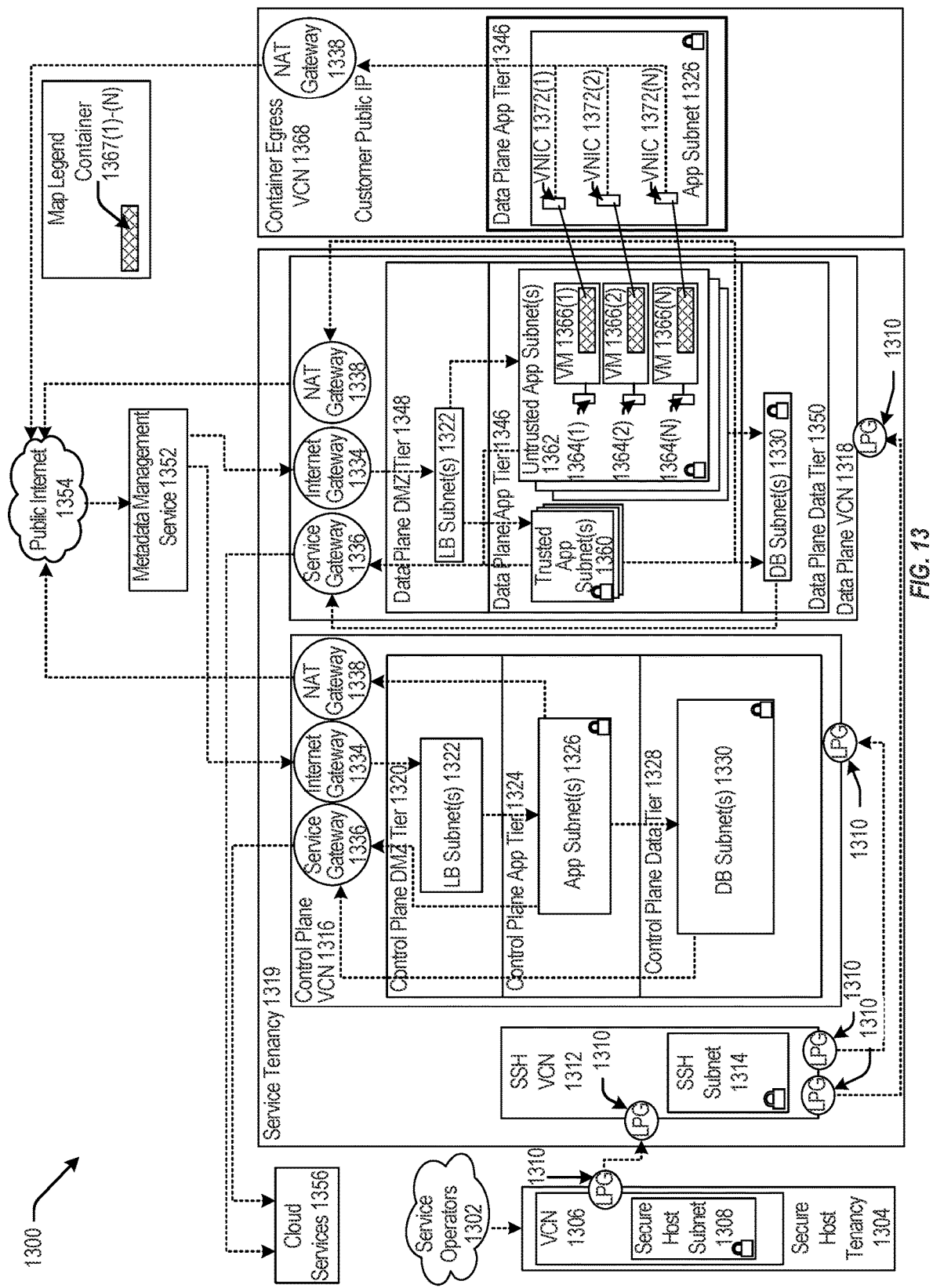
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
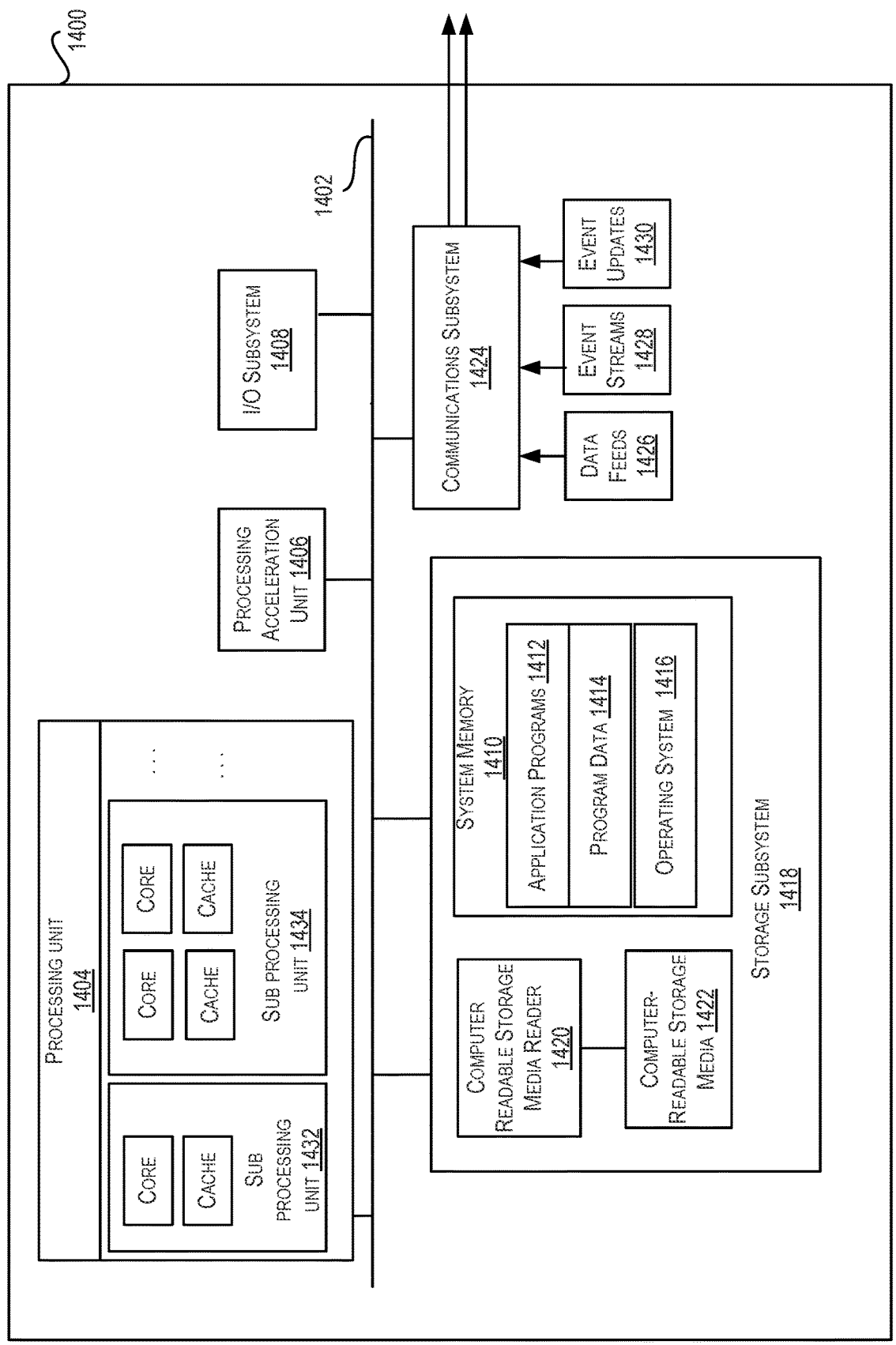
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1404 provide the functionality described above. Storage subsystem 1418 may also provide a repository for storing data used in accordance with the present disclosure.

As depicted in the example in FIG. 14, storage subsystem 1418 can include various components including a system memory 1410, computer-readable storage media 1422, and a computer readable storage media reader 1420. System memory 1410 may store program instructions that are loadable and executable by processing unit 1404. System memory 1410 may also store data that is used during the execution of the instructions and/or data that is generated during the execution of the program instructions. Various different kinds of programs may be loaded into system memory 1410 including but not limited to client applications, Web browsers, mid-tier applications, relational database management systems (RDBMS), virtual machines, containers, etc.

System memory 1410 may also store an operating system 1416. Examples of operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1400 executes one or more virtual machines, the virtual machines along with their guest operating systems (GOSs) may be loaded into system memory 1410 and executed by one or more processors or cores of processing unit 1404.

System memory 1410 can come in different configurations depending upon the type of computer system 1400. For example, system memory 1410 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1410 may include a basic input/output system (BIOS) containing basic routines that help to transfer information between elements within computer system 1400, such as during start-up.

Computer-readable storage media 1422 may represent remote, local, fixed, and/or removable storage devices plus storage media for temporarily and/or more permanently containing, storing, computer-readable information for use by computer system 1400 including instructions executable by processing unit 1404 of computer system 1400.

Computer-readable storage media 1422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Machine-readable instructions executable by one or more processors or cores of processing unit 1404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
receiving, by a computing device, a first packet addressed to a destination node;
checking, by the computing device, a packet counter to determine if the packet counter exceeds a threshold, the packet counter recording a number of packets addressed to the destination node that have been received during a first time period;
in response to the threshold exceeding the packet counter, sending the first packet to an intermediate node, the intermediate node configured to route the first packet to a destination substrate address of the destination node; and
in response to the packet counter exceeding the threshold:
sending, by the computing device, a query to the intermediate node, the query requesting the destination substrate address of the destination node;
receiving, by the computing device, a reply from the intermediate node, the reply identifying the destination substrate address and a set of processes that the intermediate node is configured to perform on the first packet;
wrapping, by the computing device, the first packet in a wrapper addressed to the destination substrate address to produce a wrapped first packet; and
sending, by the computing device, the wrapped first packet to the destination substrate address.

2. The method of claim 1, further comprising:
in response to the packet counter exceeding the threshold:
generating, by the computing device, a query flag in response to sending the query, the query flag indicating that a query has been sent to the intermediate node;
receiving a second packet for the destination node;
determining, by the computing device if the query flag was generated in a second time period before the second packet was received;
in response to a determination that the query flag was generated during the second time period:
applying, by the computing device, the set of processes to the second packet; and
forwarding, by the computing device the second packet to the destination node.

3. The method of claim 2, further comprising:
in response to a determination that the query flag was generated during a third time period:
applying, by the computing device, the set of processes to the second packet;
forwarding, by the computing device, the second packet to the destination node;
sending, by the computing device, a second query to an intermediate node;
generating, by the computing device, a second query flag in response to sending the second query, the second query flag indicating that a query has been sent to the intermediate node; and
receiving, by the computing device, a second reply from the intermediate node, the second reply identifying a second set of processes that the intermediate node is configured to perform on subsequent packets.

4. The method of claim 3, further comprising:
discarding the set of processes in response to a determination that the query flag was not generated during the first time period, the second time period, or the third time period.

5. The method of claim 2, wherein the first packet and second packet comprise a video stream.

6. The method of claim 1, wherein the query includes the first packet and the set of processes are applied to the first packet at the intermediate node.

7. The method of claim 1, wherein the set of processes comprises at least one of: discarding the packet, providing an error response to an origin node, or forwarding the packet to the destination node.

8. A non-transitory computer-readable storage medium storing a set of instructions, that, when executed by one or more processors of a computer device, cause the one or more processors to perform instructions comprising:
receiving, by a computing device, a first packet addressed to a destination node;
checking, by the computing device, a packet counter to determine if the packet counter exceeds a threshold, the packet counter recording a number of packets addressed to the destination node that have been received during a first time period;
in response to the threshold exceeding the packet counter, sending the first packet to an intermediate node, the intermediate node configured to route the first packet to a destination substrate address of the destination node; and
in response to the packet counter exceeding the threshold:
sending, by the computing device, a query to the intermediate node, the query requesting the destination substrate address of the destination node;
receiving, by the computing device, a reply from the intermediate node, the reply identifying the destination substrate address and a set of processes that the intermediate node is configured to perform on the first packet; and
wrapping, by the computing device, the first packet in a wrapper addressed to the destination substrate address to produce a wrapped first packet; and
sending, by the computing device, the wrapped first packet to the destination substrate address.

9. The computer-readable storage medium of claim 8, further comprising:
in response to the packet counter exceeding the threshold:
generating, by the computing device, a query flag in response to sending the query, the query flag indicating that a query has been sent to the intermediate node;
receiving a second packet for the destination node;
determining if the query flag was generated in a second time period before the second packet was received;
in response to a determination that the query flag was generated during the second time period:
applying the set of processes to the second packet; and
forwarding the second packet to the destination node.

10. The computer-readable storage medium of claim 9, further comprising:
in response to a determination that the query flag was not generated during a third time period:
applying, by the computing device, the set of processes to the second packet;
forwarding, by the computing device, the second packet to the destination node;
sending, by the computing device, a second query to an intermediate node;
generating, by the computing device, a second query flag in response to sending the second query, the second query flag indicating that a query has been sent to the intermediate node; and receiving, by the computing device, a second reply from the intermediate node, the second reply identifying a second set of processes that the intermediate node is configured to perform on subsequent packets.

11. The computer-readable storage medium of claim 10, further comprising:
discarding the set of processes in response to a determination that the query flag was not generated during the first time period, the second time period or the third time period.

12. The computer-readable storage medium of claim 9, wherein the first packet and second packet comprise a video stream.

13. The computer-readable storage medium of claim 8, wherein instructions for executing the set of processes are stored in cached memory.

14. The computer-readable storage medium of claim 8, wherein the set of processes comprises at least one of: discarding the packet, providing an error response to an origin node, or forwarding the packet to the destination node.

15. A routing system, comprising:
memory storing computer-executable instructions; and
one or more processors configured to access the memory, and execute the computer-executable instructions to at least:
receive, by a computing device, a first packet addressed to a destination node;
check, by the computing device, a packet counter to determine if the packet counter exceeds a threshold, the packet counter recording a number of packets addressed to the destination node that have been received during a first time period;
in response to the threshold exceeding the packet counter, sending the first packet to an intermediate node, the intermediate node configured to route the first packet to a destination substrate address of the destination node; and
in response to the packet counter exceeding the threshold:
send, by the computing device, a query to the intermediate node, the query requesting the destination substrate address of the destination node;
receive, by the computing device, a reply from the intermediate node, the reply identifying the destination substrate address and a set of processes that the intermediate node is configured to perform on the first packet;
wrapping, by the computing device, the first packet in a wrapper addressed to the destination substrate address to produce a wrapped first packet; and
sending, by the computing device, the wrapped first packet to the destination substrate address.

16. The system of claim 15, further comprising:
in response to the packet counter exceeding the threshold:
generate, by the computing device, a query flag in response to sending the query, the query flag indicating that a query has been sent to the intermediate node;
receive, by the computing device, a second packet for the destination node;
determine, by the computing device, if the query flag was generated in a second time period before the second packet was received;
in response to a determination that the query flag was generated during the second time period:
apply, by the computing device, the set of processes to the second packet; and
forward, by the computing device, the second packet to the destination node.

17. The system of claim 16, further comprising:
in response to a determination that the query flag was not generated during a third time period:
apply, by the computing device, the set of processes to the second packet;
forward, by the computing device, the second packet to the destination node;
send, by the computing device, a second query to an intermediate node;
generate, by the computing device, a second query flag in response to sending the second query, the second query flag indicating that a query has been sent to the intermediate node; and
receive, by the computing device, a second reply from the intermediate node, the second reply identifying a second set of processes that the intermediate node is configured to perform on subsequent packets.

18. The system of claim 17, further comprising:
discard, by the computing device, the set of processes in response to a determination that the query flag was not generated during the first time period, the second time period, or the third time period.

19. The system of claim 15, wherein instructions for executing the set of processes are stored in cached memory.

20. The system of claim 15, wherein the set of processes comprises at least one of: discarding the packet, providing an error response to an origin node, or forwarding the packet to the destination node.

* * * * *